Aug. 17, 1948.  C. J. KEIM  2,447,185
DETACHABLE FLUID LINE MANIFOLD
Filed May 17, 1946
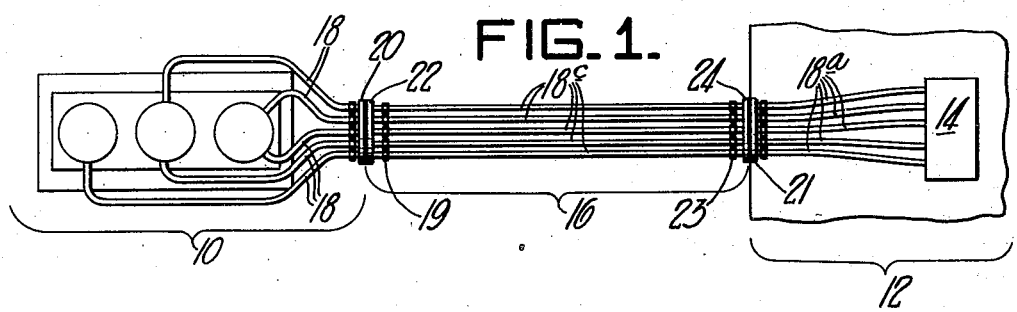
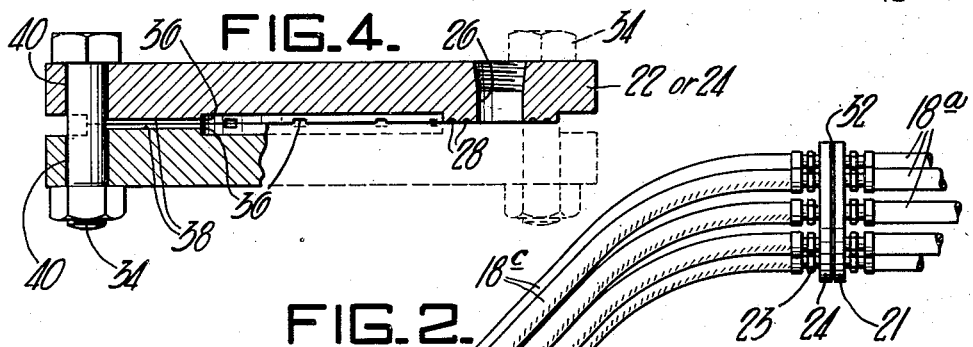
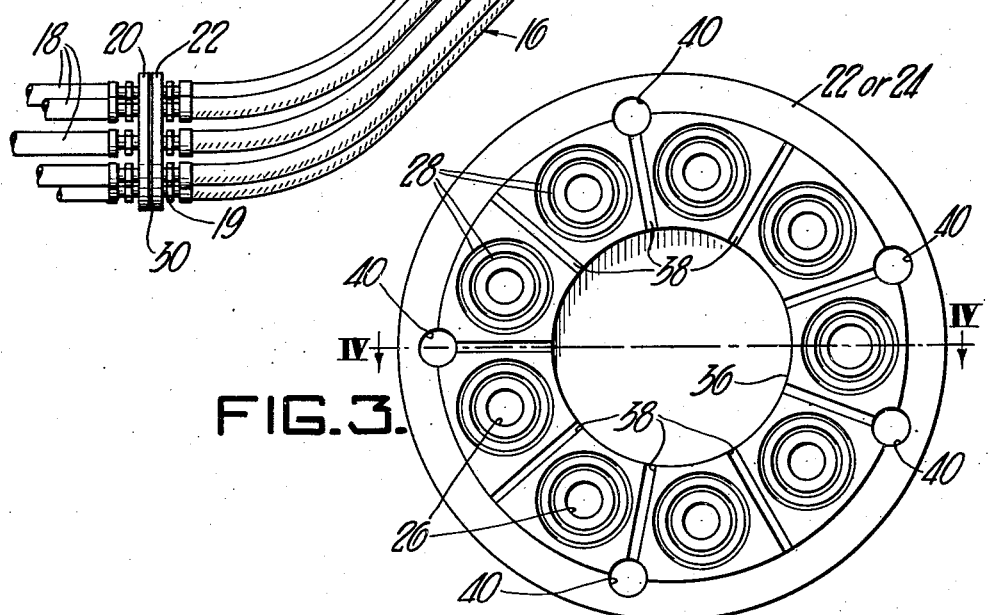
INVENTOR:
CHARLES J. KEIM,
BY:
Donald G. Dalton
HIS ATTORNEY.

Patented Aug. 17, 1948

2,447,185

UNITED STATES PATENT OFFICE 2,447,185

DETACHABLE FLUID LINE MANIFOLD

Charles J. Keim, Oil City, Pa., assignor to Oil Well Supply Company, a corporation of New Jersey Application May 17, 1946, Serial No. 670,654

3 Claims. (Cl. 285—23)

This invention aims to provide a detachable manifold unit which, while not limited thereto, is peculiarly well suited for connecting a plurality of fluid pipe lines of an engine for driving oil well drilling and hoisting apparatus with a control panel unit at a drillers' station on the drawworks where it is desirable that the driller be able to ascertain the conditions of the fluid in the pipe lines leading to the power unit or that he be able to control the flow of motive fluid to the engine unit from his station through the pipe lines. In oil field drawworks employing prime movers of the type which require clutches actuated by compressed air or other motive fluid, it is advantageous to have some means of releasably connecting the fluid lines between the prime mover drive and the drawworks proper when transferring the apparatus from one drilling location to another. Where internal combustion engines are used as prime movers, it is desirable to have vacuum lines running between the engines and the driller's station at the drawworks so as to indicate the engine manifold vacuum and these pipe lines must be so arranged that they can be disconnected. Where forced feed lubrication is employed in the engine drive it is desirable to have an oil pressure line running to the driller's control station and this line must also be disconnected when moving from one drilling location to another. The invention as hereinafter more fully described, illustrated and claimed makes it possible to quickly, easily and accurately make the initial assembly of the various pipe lines and to readily reconnect them when changing the field of oil well drilling operations. For a more complete understanding of the invention, reference should be made to the following detail disclosure, the accompanying drawings and the appended claims.

In the drawings:

Figure 1 is a somewhat diagrammatic plan view illustrating a prime mover having a multiplicity of pipe lines connected with a control panel at the driller's station of the drawworks by a detachable manifold embodying the present invention;

Figure 2 is an elevation at an enlarged scale, illustrating the connection between the prime mover unit and a fixed part of the drawworks adjacent to control panel unit thereof;

Figure 3 is an enlarged view of the outer face of one of the flanges of the detachable manifold;

Figure 4 is a section on line IV—IV of Figure 3.

Referring in detail to the drawings, 10 represents a prime mover such as an internal combustion engine adapted to drive an oil well drilling mechanism. 12 represents the drawworks as a whole which preferably includes a control panel 14 having numerous gauges and valves for controlling a supply of motive fluid to the engine, and the gauges showing the condition of the vacuum line, of the oil pressure and the like. In the normal operation of oil drilling apparatus, it is well known to those skilled in the art that after drilling operations have been completed at a given location, it is frequently the practice to move the apparatus to another location and resume further drilling operations. This necessitates disconnecting numerous pipe connections between the engine unit 10 and the control panel unit 14 located on the drawworks proper. To facilitate making the initial assembly and also breaking the pipe connections between the engine unit and the drawworks when changing locations of the rig, I provide an improved detachable manifold indicated at 16 which is adapted to be unbolted and removed as a unit.

By way of illustration, I have shown a multiplicity of fluid pipe lines 18 forming part of the prime mover unit and these lines terminate at a face plate 20 suitably secured to any fixed part of the prime mover unit 10.

To illustrate the invention, I have shown on the drawworks a control panel 14 located at the driller's control station with a plurality of pipe lines 18$^a$ leading thereto. This control panel may be assumed to contain gauges to show the pressure in the pipes 18 or to contain valves to control the flow of motive fluid through certain of said pipes to the prime mover. Some of the pipes may be assumed to have valves at the control panel 14 which control the supply of compressed air to cylinders having pistons therein for actuating various clutches forming part of the drive for drawworks hoisting mechanism, or the rotary used in drilling. When the field of drilling operations is to be changed, it becomes necessary to disconnect the drawworks unit 12 from the prime mover unit 10 and the manifold of the present invention greatly facilitates the disconnecting and reconnecting in proper registry of the multiplicity of pipes. The original assembly and the making of many pipe connections in an orderly, accurate manner at the time of changing the location of the rig is made possible by the provision of the detachable manifold unit indicated as a whole at 16. This manifold includes a multiplicity of ducts 18$^c$ which provide for connecting the respective pipes 18 with pipes 18$^a$. Each of the several ducts 18$^c$ are coupled by means of suitable fittings 19 at one end to a flange plate 22 and at their other end by similar fittings 23 to a flange plate 24. Flange plate 24 is adapted to be detachably bolted to a fixed face plate 21 bolted to or forming part of the drawworks unit 12. The ducts 18c are preferably, though not necessarily, flexible. The flange plates 22 and 24 are substantial duplicates, therefore, a description of one will suffice for both. As illustrated in Figure 3, each flange plate illustrated has a plurality of holes 26 which may or may not be spaced equal distances apart, but for convenience are illustrated as equally spaced around the circumference of the circle passing through the center of each hole. The fittings on the ends of the flexible pipes 18c connect with the holes 26 and thus obviously each pipe 18 is coupled by a manifold duct 18c with a corresponding pipe 18a leading to the control panel 14. Surrounding each hole 26, I provide at least one groove 28 which is cut into the face of the flange. Interposed between plate 20 and flange 22 there is a gasket 30, and interposed between the flange 24 and plate 21 there is a similar gasket 32. The grooves 28 surrounding the holes 26 are adapted to provide a more effective seal between the flanges and the gaskets by reason of the fact that the gasket material is expanded into the grooves 28 under the clamping action of bolts 34 which serve to detachably secure the flange 22 to the plate 20 and the flange 24 to the plate 21.

The central region of each flange 22 and 24 is cut away, relieved or depressed as indicated at 36. And, between the several holes 26, I provide substantial radial grooves 38 which extend outwardly. These grooves function as leakage passageways for the escape of fluid which may accidentally leak from one of the pipes and thus prevent the forcing of any such fluid into an adjacent pipe where its presence might cause serious damage. The bolts 34 which detachably couple the manifold 16 to the respective fixed plates 20 and 21 of the engine and the drawworks unit, preferably pass through holes 40 which are unsymmetrically spaced, for example as shown in Figure 3, so that the flanges can be bolted together in only one, the proper position, thus avoiding the possibility of improperly connecting the pipes 18 and 18a.

Various modifications are contemplated and can be made by those skilled in the art without departure from the invention as defined in the appended claims.

I claim:

1. An oilfield drawworks layout including at least one prime mover unit requiring pipe lines and connections for transmittal of motive fluid, and a driller's control station unit where continuations of said pipe lines are required, the improvement which comprises respective fixed, spaced face plates at the prime mover unit and at the control station unit where the pipe lines terminate, and a unitary detachable manifold consisting of one flange adapted to be detachably secured to the face plate of the prime mover unit, another flange adapted to be detachably secured to the face plate of the control station unit and a plurality of ducts secured to and terminating at said flanges, each of the pipe connections in the fixed plate of the prime mover unit having a corresponding pipe connection in the fixed plate of said control station unit adapted to be connected by one of said ducts, said flanges and fixed plates having registering means positioning the manifold to connect the individual ducts with their respective pipe connections upon assembly.

2. A detachable manifold unit assembly of the character described comprising spaced flanges with a plurality of ducts connected at the respective inner faces thereof, the central region of each flange being depressed below the outer face of each flange, a series of leakage-escape grooves extending outwardly from the central depressed region of each said flange, each flange having a plurality of unsymmetrically spaced bolt holes therein adapted to facilitate the securing of registry of said ducts with pipes spaced to correspond to the spacing of said ducts and whose ends terminate in fixed members to which said flanges are secured by bolts extending through said holes.

3. A detachable manifold unit assembly comprising two flange plates each having a circular series of holes therein, flexible ducts whose opposite ends carry respective fittings engaging said holes, at least one depressed gasket engaging groove encircling each hole in each said flange plate, the central region of each flange plate being offset inwardly from the outer face thereof, a leakage-escape groove extending outwardly between each adjacent pair of holes of each said series, and a plurality of unsymmetrically spaced bolt holes in each flange plate adapted to facilitate the securing of registry of said ducts with pipes spaced to correspond to the arrangement and spacing of said ducts and whose ends terminate in fixed members to which said flanges are secured by bolts extending through said holes.

CHARLES J. KEIM.

REFERENCES CITED

The following references are of record in the file of this patent:

UNITED STATES PATENTS

| Number | Name | Date |
| --- | --- | --- |
| 231,479 | Davis | Aug. 24, 1880 |
| 652,816 | Snyder | July 3, 1900 |
| 1,320,735 | Chapman | Nov. 4, 1919 |
| 1,954,454 | McFarland | Apr. 10, 1934 |

FOREIGN PATENTS

| Number | Country | Date |
| --- | --- | --- |
| 221,263 | Great Britain | 1924 |
| 484,815 | Great Britain | 1938 |
| 438,654 | Germany | 1926 |